Oct. 9, 1962        E. A. WAGNER        3,057,319
ROUGH TERRAIN AMPHIBIOUS VEHICLE
Filed June 23, 1960        2 Sheets-Sheet 1

INVENTOR.
Elmer A. Wagner
BY
Buckhorn, Cheatham & Blore
ATTORNEYS

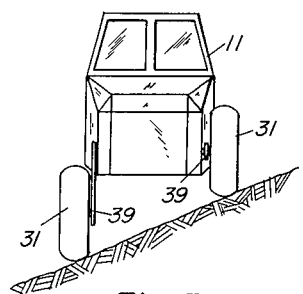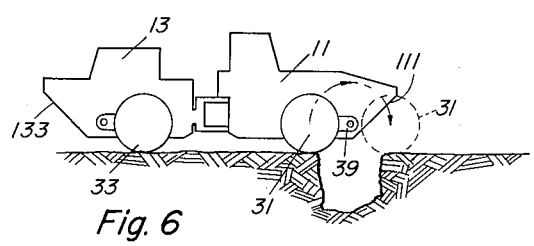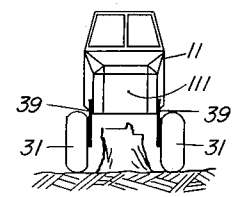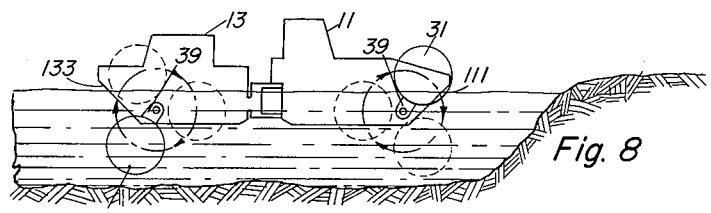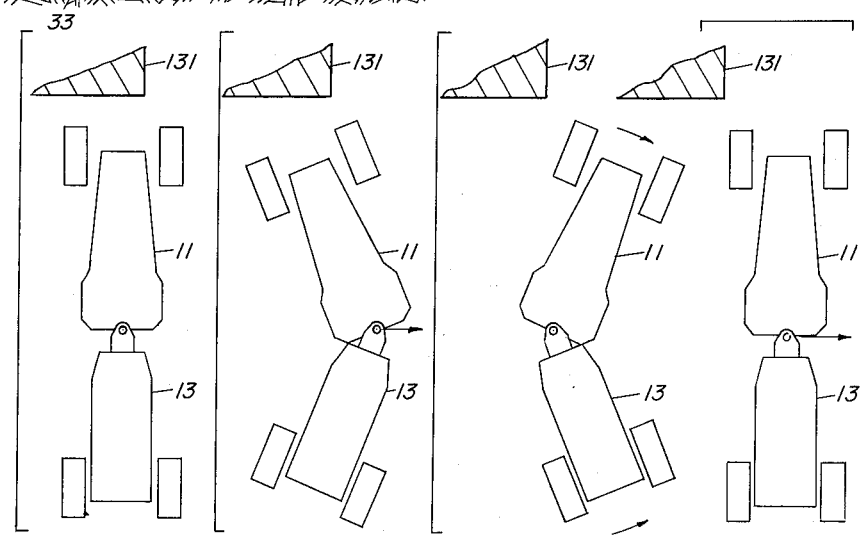

United States Patent Office
3,057,319
Patented Oct. 9, 1962

3,057,319
ROUGH TERRAIN AMPHIBIOUS VEHICLE
Elmer A. Wagner, Portland, Oreg.
(Rte. 1, Box 120, Cornelius, Oreg.)
Filed June 23, 1960, Ser. No. 38,373
18 Claims. (Cl. 115—1)

This invention relates to rough terrain vehicles, particularly to vehicles capable of transporting men and material to regions which are generally considered inaccessible by ordinary means of travel.

A main object of the present invention is to provide an amphibious rough terrain vehicle, and particularly one in which the means employed for locomotion on land is utilized to provide locomotion in water.

A further object is to provide such a vehicle in which the locomotion means provides level travel over inclined terrain, and passage over ditches, gullies, logs, stumps and other obstructions, and in addition facilitates climbing action and also sidewise movement of said vehicle.

Another object is to provide a four-wheel-drive vehicle of the above type which, while being capable of travel over rough terrain, is also capable of operation over roads and highways at normal traffic speeds, so that the vehicle can be driven to the place of use, rather than having to be transported on other vehicles.

Various other objects of the invention will be apparent from the following description taken in connection with the accompanying drawings wherein:

FIG. 5 shows the vehicle traveling along inclined terrain;

FIG. 6 shows the vehicle about to cross a ditch;

FIG. 7 shows the vehicle moving over a stump;

FIG. 8 shows the vehicle traveling in water; and

FIGS. 9 through 12 show the vehicle traveling sidewise.

Figure 1:
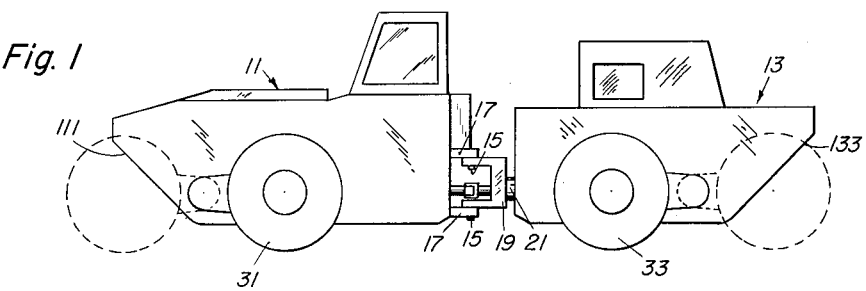
FIG. 1 is a side view of a vehicle of the present invention.
Figure 2:
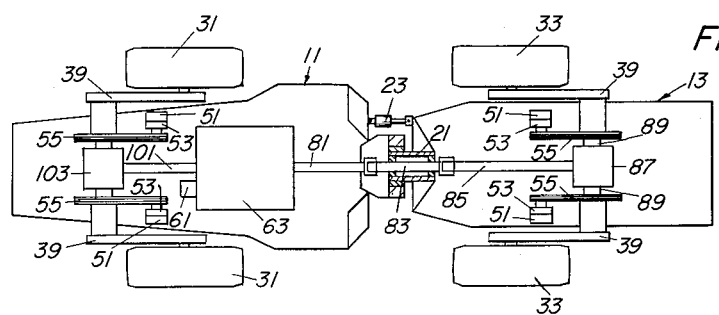
FIG. 2 is a diagrammatic plan view showing the drive to the wheels superposed on an outline of the vehicle body sections.

Referring to FIGS. 1 and 2, the vehicle includes two body sections, a front section 11 and a rear section 13. Each section is watertight so it constitutes a hull section. The two hull sections are connected for articulation about a vertical axis by means of pivots 15 connecting spaced fixed members 17 on the hull section 11 to a clevislike member 19, the latter being journaled on a tubular support 21 fixed to the hull section 13. A hydraulic piston and cylinder unit 23 connects the hull sections and provides for articulation of the sections for steering and other purposes.

Figure 3:
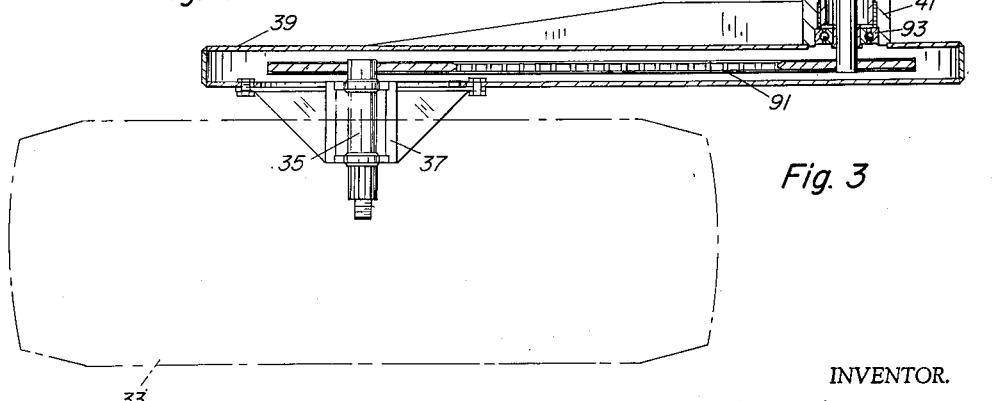
FIG. 3 is an enlarged horizontal section of the drive means for the wheels.

The front hull section 11 has a pair of wheels 31 and the rear hull section has a pair of wheels 33. The wheels are mounted in the same manner, and FIG. 3 shows the mount for a wheel 33. The wheel is fixed to an axle 35 rotatably supported by a bracket 37 fixedly secured to the outboard end of a hollow arm 39. The inboard end of the arm has a trunnion 41 journaled in a sleeve 43 fixed to the hull of the section 13.

The trunnion 41 is driven by a hydraulic motor 51 mounted in the hull. The motor drives a worm gear reduction unit 53 which drives the trunnion 41 through a chain and sprocket drive 55. The unit 53 provides a nonreversible drive and automatically locks an arm in the position in which it is left.

Fluid under pressure is supplied to the motors 51 by a pump and reservoir unit 61 driven by the engine 63 of the vehicle. The connection between the engine and the pump is such that anytime the engine is running, the pump is driven.

Figure 4:
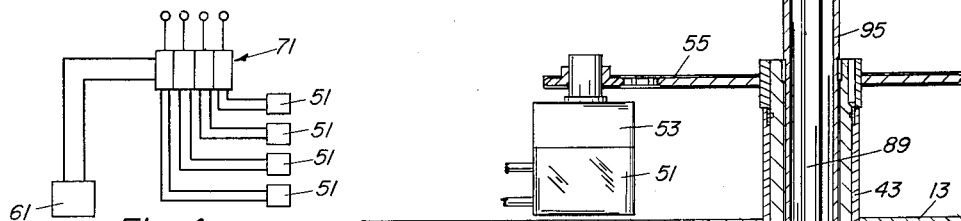
FIG. 4 is a schematic view of part of the fluid system of the vehicle.

Referring to FIGS. 2 and 4, four independently manually operable valves, generally indicated by the reference numeral 71, are mounted near the driver of the vehicle and control the flow of fluid in independent fashion from the pump unit 61 to the motors 51. The valves can supply fluid to the motors to drive the motors in either direction. When the valves are in their neutral positions, fluid from the pump is by-passed to the reservoir.

The engine 63 has a rear drive shaft including three sections 81, 83 and 85 connected by universal points as shown, the central section 83 being rotatably mounted in the sleeve 21, and the forward and rear sections being rotatably supported by the bearings (not shown) in their respective hull sections.

Referring now to FIGS. 2 and 3, the shaft section 85 drives the wheels 33 through a positive traction differential 87, a pair of shafts 89 from the differential, one of which is shown, and a chain and sprocket drive 91 connected to the wheel axle 35. The shaft 89 in FIG. 3 is mounted by bearings 93, one being shown, in a sleeve or dead axle 95 on which the trunnion 41 is journaled. Suitable fluid seals are provided at appropriate places so that the hull remains water tight, and suitable split rings or equivalent structure is provided at suitable places to prohibit endwise movement of various parts.

The engine also has a front drive shaft 101 driving a positive traction differential 103 which drives the wheels 31 in the same manner that differential 87 drives the wheels 33.

It is apparent that the above described vehicle is extremely versatile. As shown in FIG. 5, by appropriately locating the arms 39 so that the wheels on one side are lower than the wheels on the opposite side, the vehicle may travel along inclined terrain with the body level. Also, because the arms are driven independently of the wheels, the body may be maintained level by suitable adjustment of the arms while traveling along terrain which varies in inclination.

As shown in FIG. 6, the vehicle can also cross ditches readily by approaching the ditch with the front wheels 31 in their rear positions. When such wheels are at the edge of the ditch, the vehicle can be stopped and the front wheels swing in a clockwise direction to position the wheels across the ditch.

A log can be similarly crossed by running the inclined front end 111 against the log, with the front wheels rearwardly disposed, then swinging such wheels over onto the log.

FIG. 7 shows the vehicle moving over a stump, which operation is readily accomplished by merely locating the arms 39 straight down to dispose the body sections at an elevation sufficient to clear the stump.

The vehicle can climb up a bank by approaching the bank with the wheels in the FIG. 7 positions and running the inclined front end 111 onto the edge of the bank so that the front end is supported thereby. Then the wheels are swung up and onto the terrain back of the bank and the front end of the vehicle lifted and the vehicle driven forwardly. The rear wheels then climb the bank in an obvious manner.

FIG. 8 shows the vehicle traveling through water. This is accomplished by rotating the arms 39 in continuous fashion as illustrated.

FIGS. 9 through 12 illustrate sidewise travel of the vehicle. It may be assumed that sidewise travel is necessary, such as to get around an obstruction 131 at a time when it is not possible because of other obstructions or special condition to turn the vehicle to travel in such direction. Sidewise travel is achieved by turning the body sections so the inner ends thereof project laterally in the direction of desired movement. The wheels are then raised to allow the smooth bottom surfaces of the hull sections to rest on the ground. Then the hull sections are pivoted in the reverse directions. Because the hull sections will tend to pivot on the ground about central portions of the bottom surfaces of the hulls, there will be advancement of the hulls and particularly the wheels in a lateral direction. Then the wheels are lowered and the body sections straightened out to achieve further lateral advancement. If still further lateral advancement is desired, the operation may be repeated.

The operations described above are merely illustrative of the versatility of the vehicle. While forward travel of the vehicle has been mentioned, the vehicle can also travel rearwardly, and an inclined rear face 133 is provided on the hull section 13 for reasons similar to those given in connection with face 111.

Having described the invention in what is considered to be the preferred embodiment thereof, it is desired that it be understood that the invention is not to be limited other than by the provisions of the following claims.

I claim:

1. A vehicle of the class described comprising body means, wheel means for the body means including a plurality of wheels, at least certain of the wheels being mounted for rotary movement about their own axes and also about axes spaced therefrom, each of said certain wheels projecting below said body means when the wheel axis is on the same level as the associated spaced axis so that such wheel can drivingly engage the ground in both of its horizontally remote positions 180 degrees from one another to facilitate bridging an obstruction such as a ditch, and means for driving said certain wheels about said spaced axes a complete revolution.

2. A vehicle of the class described comprising body means, wheel means for the body means including a plurality of wheels, at least certain of the wheels being mounted for rotary movement about their own axes and also about axes spaced therefrom, each of said certain wheels projecting below said body means when the wheel axis is on the same level as the associated spaced axis so that such wheel can drivingly engage the ground in both of its horizontally remote positions 180 degrees from one another to facilitate bridging an obstruction such as a ditch, and means for driving said certain wheels about said spaced axes a complete revolution, said driving means including means for locking said wheels against movement about said spaced axes.

3. A vehicle of the class described comprising body means, wheel means for the body means including a plurality of wheels, at least certain of the wheels being mounted for rotary movement about their own axes and also about axes spaced therefrom, each of said certain wheels projecting below said body means when the wheel axis is on the same level as the associated spaced axis so that such wheel can drivingly engage the ground in both of its horizontally remote positions 180 degrees from one another to facilitate bridging an obstruction such as a ditch, and means for driving said certain wheels about said spaced axes a complete revolution, said driving means including nonreversible means to automatically lock said wheels against movement about said spaced axes when the driving means ceases driving said wheels.

4. A vehicle of the class described comprising body means, wheel means for the body means including a plurality of wheels, at least certain of the wheels being mounted for rotary movement about their own axes and also about axes spaced therefrom, each of said certain wheels projecting below said body means when the wheel axis is on the same level as the associated spaced axis so that such wheel can drivingly engage the ground in both of its horizontally remote positions 180 degrees from one another to facilitate bridging an obstruction such as a ditch, and means for driving said certain wheels about said spaced axes a complete revolution, said means for independently driving said wheels about their own axes.

5. A vehicle of the class described comprising body means, wheel means for the body means including a plurality of wheels, at least certain of the wheels being mounted for rotary movement about their own axes and also about axes spaced therefrom, each of said certain wheels projecting below said body means when the wheel axis is on the same level as the associated spaced axis so that such wheel can drivingly engage the ground in both of its horizontally remote positions 180 degrees from one another to facilitate bridging an obstruction such as a ditch, and means for driving said certain wheels about said spaced axes a complete revolution, and means for driving said wheels about their own axes, the last-mentioned means being independent of the first-mentioned driving means.

6. A vehicle of the class described comprising two body sections connected for relative turning movement about a longitudinal axis and for articulated movement about a vertical axis, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horiozntally remote positions 180 degrees from one another to facilitate bridging an obstruction such as a ditch, means for driving said arm means a complete revolution, and means for driving said wheels about their own axes.

7. A vehicle of the class described comprising two body sections connected for relative turning movement about a longitudinal axis and for articulated movement about a vertical axis, power means for causing articulating movement about said vertical axis to facilitate steering said vehicle, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horizontally remote positions 180 degrees from one another to facilitate bridging an obstruction such as a ditch, means for driving said arm means a complete revolution, and means for driving said wheels about their own axes, the driving means for said arm means being operable to lock said arm means in any position in which said arm means are left.

8. A vehicle of the class described comprising two body sections connected for relative turning movement about a longitudinal axis and for articulated movement about a vertical axis, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horizontally remote positions 180 degrees from one another to facilitate bridging an obstruction such as a ditch, means for driving said arm means a complete revolution, and means for driving said wheels about their own axes, said driving means being operable to drive each arm means independently of the other arm means.

9. A vehicle of the class described comprising two body sections connected for relative turning movement about a longitudinal axis and for articulated movement about a vertical axis, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horizontally remote positions 180 degrees from one another to facilitate bridging an obstruction such as a ditch, means for driving said arm means a complete revolution, and means for driving said wheels about their own axes, the driving means for said arm means being operable to lock said arm means in any position in which said arm means are left, said driving means being operable to drive each arm means independently of the other arm means.

10. A vehicle of the class described comprising two body sections connected for relative turning movement about a longitudinal axis and for articulated movement about a vertical axis, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horizontally remote positions 180 degrees from one another to facilitate bridging an obstruction such as a ditch, means for driving said arm means a complete revolution, and means for driving said wheels about their own axes, the last-mentioned means including a prime mover in one body section drivingly connected to each wheel.

11. An amphibious vehicle comprising buoyant body means, wheel means for said body means including a plurality of wheels mounted for rotary movement about their own axes and also about axes spaced therefrom, said wheels being capable of occupying positions in which the lower surfaces thereof are below the bottom surfaces of said body means and other positions in which said lower surfaces are above such bottom surfaces, and means for driving said wheels about both sets of axes a plurality of complete revolutions in at least one direction to facilitate travel on land because of rotation of said wheels about their own axes and travel in water and muck because of rotation of said wheels about said spaced axes.

12. An amphibious vehicle comprising two buoyant hull sections, wheel means for the hull sections including a plurality of wheels mounted for rotary movement about their own axes and also about axes spaced therefrom, said wheels being capable of occupying positions in which the lower surfaces thereof are below the bottom surfaces of said hull sections and other positions in which said lower surfaces are above such bottom surfaces, and means for driving said wheels about both sets of axes a plurality of complete revolutions in at least one direction to facilitate travel on land because of rotation of said wheels about their own axes and travel in water and muck because of rotation of said wheels about said spaced axes, said driving means being operable to drive each wheel about said spaced axes independently of the other wheels.

13. An amphibious vehicle comprising two buoyant hull sections, wheel means for the hull sections including a plurality of wheels mounted for rotary movement about their own axes and also about axes spaced therefrom, said wheels being capable of occupying positions in which the lower surfaces thereof are below the bottom surfaces of said hull sections and other positions in which said lower surfaces are above such bottom surfaces, and means for driving said wheels about both sets of axes a plurality of complete revolutions in at least one direction to facilitate travel on land because of rotation of said wheels about their own axes and travel in water and muck because of rotation of said wheels about said spaced axes, said driving means being operable to drive each wheel about said spaced axes independently of the other wheels, said driving means being operable to lock said wheels against movement about said spaced axes anytime said wheels are not being driven about such spaced axes.

14. An amphibious vehicle comprising hull means, wheels mounted on said hull means for rotary movement about their own axes and also about axes spaced therefrom, and means for driving said wheels in continuous fashion a number of complete revolutions in at least one direction about said spaced axes to facilitate travel in water, and for independently driving said wheels about their own axes to facilitate travel on land.

15. A vehicle of the class described comprising two body sections connected for articulating movement about a vertical axis, power means for causing relative movement of the body sections about said vertical axis, ground-engaging means on each body section in spaced relation to said vertical axis, means for moving said ground-engaging means to positions below the bottom surfaces of said body sections so that said ground-engaging means engage the ground in spaced relation below the bottom surfaces of said body sections, said means also moving said ground-engaging means to positions above the bottom surfaces of said body sections to permit said body sections to rest on the ground so that by alternate raising and lowering of said ground-engaging means and alternate operation of said power means, the vehicle may be made to move sideways.

16. A vehicle of the class described comprising two body sections connected for articulating movement about a vertical axis, power means for causing relative movement of the body sections about said vertical axis, wheel means on each body section in spaced relation to said vertical axis, means for moving said wheel means to positions below the bottom surfaces of said body sections so that said wheel means engage the ground in spaced relation below the bottom surfaces of said body sections, said means also moving said wheel means to positions above the bottom surfaces of said body sections to permit said body sections to rest on the ground so that by alternate raising and lowering of said wheel means and alternate operation of said power means, the vehicle may be made to move sideways.

17. A vehicle of the class described comprising two body sections connected for articulated movement about a vertical axis, a pair of wheels for each body section, arm means for each wheel mounting the wheels for rotary movement about their own axes and also about axes spaced therefrom, each of said wheels projecting below the associated body section when the wheel axis is on the same level as the associated spaced axis so that such wheel can drivingly engage the ground in both of its horizontally remote positions 180 degrees from one another to facilitate bridging an obstruction such a ditch, means for driving said arm means a complete revolution, and means for driving said wheels about their own axes.

18. A vehicle of the class described comprising body means, wheel means for the body means including a plurality of wheels, at least certain of the wheels being mounted for rotary movement about their own axes and also about axes spaced therefrom, and means for driving said certain wheels about said spaced axes a complete revolution, said means including motor means in stationary relation to said body means, and power means for driving said wheels about their own axes, the last-mentioned means being independent of the first-mentioned driving means.

References Cited in the file of this patent

UNITED STATES PATENTS

| | | |
|---|---|---|
| 2,350,037 | Hofheins et al. | May 30, 1944 |
| 2,399,141 | Quinn | Apr. 23, 1946 |
| 2,532,785 | Richter | Dec. 5, 1950 |
| 2,885,990 | Hawthorne | May 12, 1959 |
| 2,913,061 | Beyerstedt et al. | Nov. 17, 1959 |
| 2,933,143 | Robinson et al. | Apr. 19, 1960 |

FOREIGN PATENTS

| | | |
|---|---|---|
| 252,815 | Germany | Oct. 26, 1912 |
| 981,349 | France | Jan. 10, 1951 |
| 126,070 | Great Britain | May 8, 1919 |